Patented Aug. 4, 1942

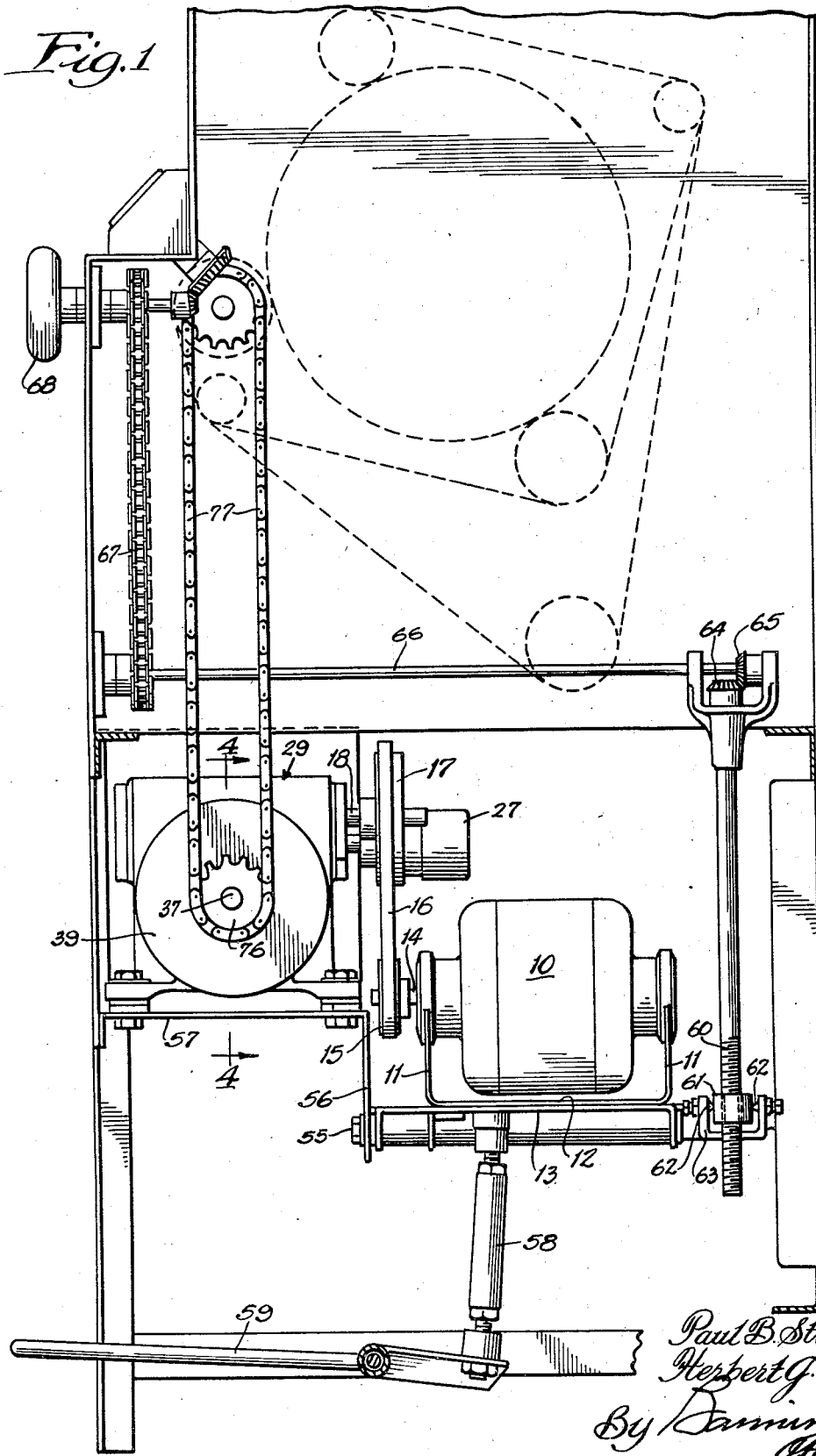

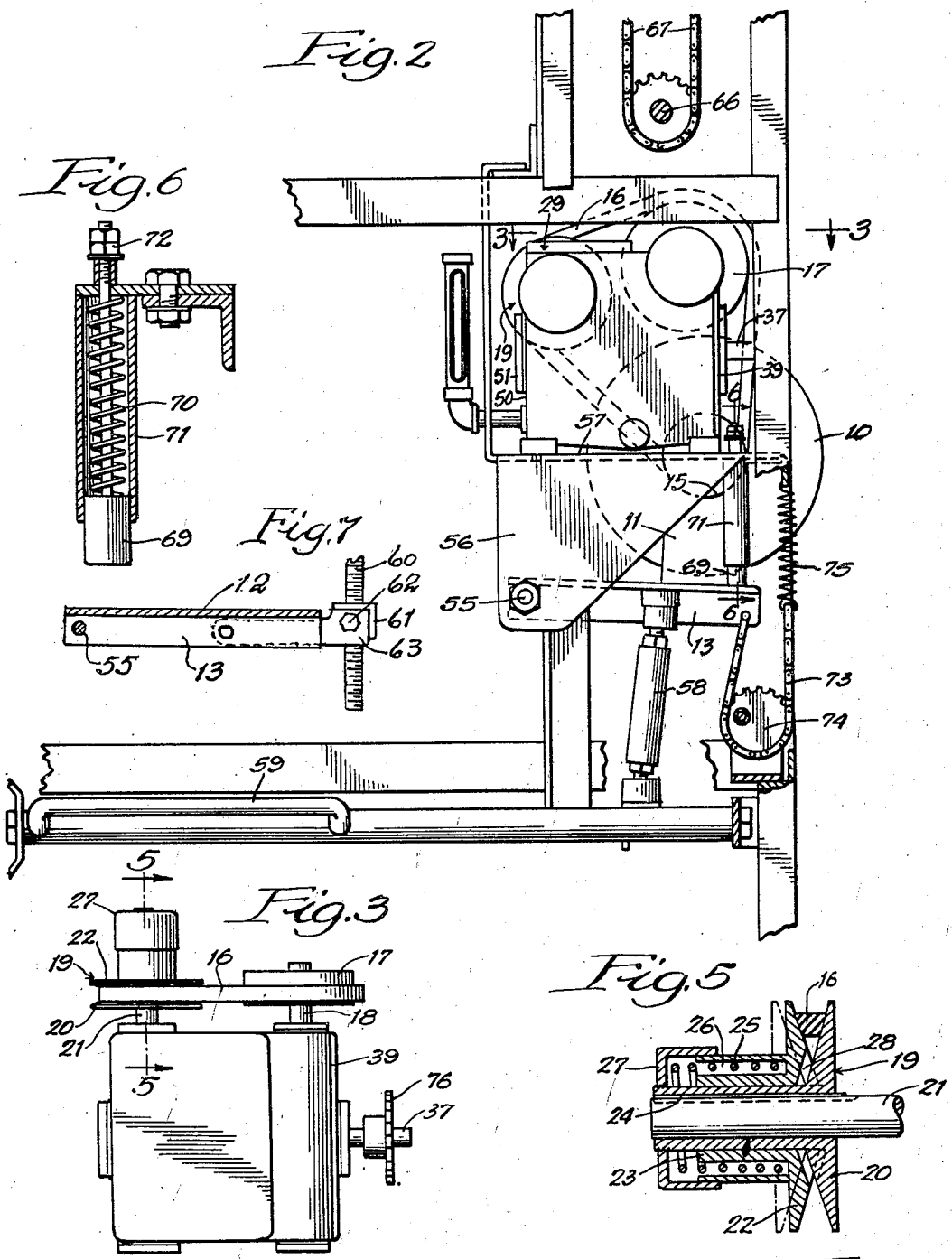

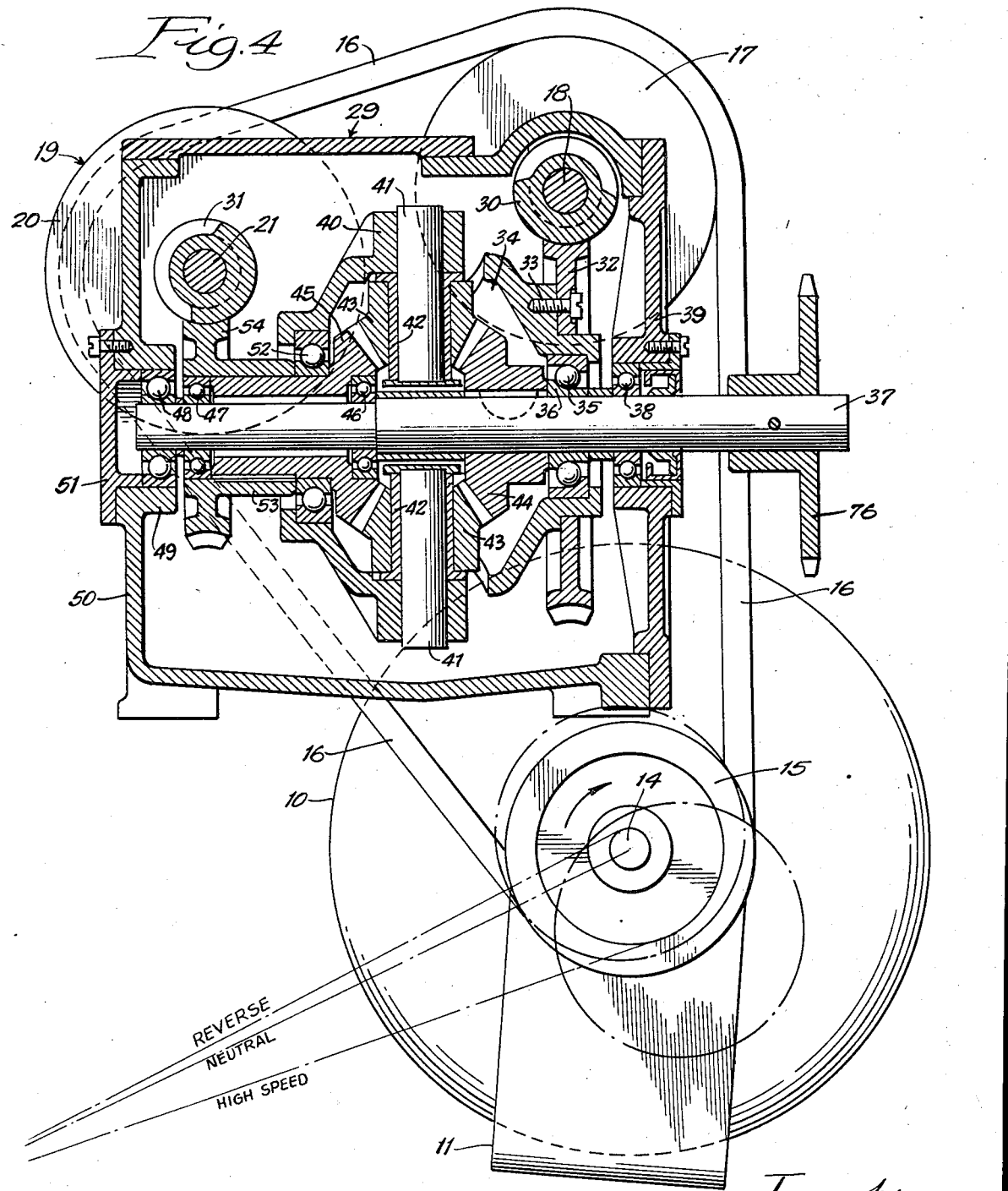

2,291,928

UNITED STATES PATENT OFFICE 2,291,928

VARIABLE POWER TRANSMISSION MECHANISM

Paul B. Streich, Maywood, and Herbert G. Macdonald, Oak Park, Ill., assignors to Charles Bruning Co., Inc., Chicago, Ill., a corporation of Illinois Application January 18, 1941, Serial No. 374,996

5 Claims. (Cl. 74—286)

The power transmission mechanism of the present invention is designed to permit variations in speed of power transmission throughout a wide range, and by the employment of a self-contained group of mechanisms which may be easily and accurately applied to mechanism or equipment requiring variation in speed of operation.

The device of the present invention has been designed primarily for use in the driving of the feed mechanism employed in the feeding of sheets of sensitized paper through a photo-printing machine in which a wide range in the period of exposure is desirable, although the variable speed mechanism is equally adapted for use in connection with other types of machines or appliances.

Further objects and details will appear from the description of the invention in conjunction with the accompanying drawings, wherein—

Figure 1 is a side elevation of the variable speed mechanism of the present invention associated with a photo-printing machine;

Fig. 2 is an end elevation of the same;

Fig. 3 is a plan view looking downwardly upon the casing of the differential mechanism constituting a part of the variable speed train;

Fig. 4 is an enlarged sectional view taken on line 4—4 of Figure 1, looking in the direction of the arrows;

Fig. 5 is a longitudinal sectional detail of the variable speed drive pulley;

Fig. 6 is a sectional view taken on line 6—6 of Fig. 2, looking in the direction of the arrows; and Fig. 7 is a sectional view through the pivoted motor platform with the adjusting connections in elevation.

The variable speed assembly comprises a motor 10 which is supported by the arms 11 of a cradle 12 mounted upon a rectangular platform 13. The motor shaft 14 carries a pulley 15 over which runs a belt 16 wedge-shaped in cross section. The belt is carried around a smooth faced pulley 17 mounted upon a primary worm shaft 18, and thence around a grooved adjustable pulley 19 which comprises a fixed section 20 keyed upon a secondary worm shaft 21, and a movable section 22 provided with a hub 23 which is slidably mounted upon the hub 24 of the fixed pulley section. The movable section is backed by a spring 25 which is housed within an annular recess 26 and bears against a cap 27 on the end of the hub of the fixed pulley section.

The fixed and movable pulley sections have oppositely disposed beveled faces, which are reciprocally notched as at 28 to afford an interlocking fit with one another, which maintains the interlocking relation despite variations in the spread between the pulley sections, occasioned by the drawing in of the wedge-shaped belt 16, which may be positioned as shown in full lines in Fig. 5, or drawn inwardly into comparatively close relation to the interfitting hubs of the fixed and movable pulley sections, or adjusted to positions more nearly adjacent to the periphery of the divided pulley. A pulley of this character is standard and no claim is made for this device per se.

The primary and secondary worm shafts 18 and 21 are journalled through the side walls of the casing 29 which houses the differential mechanism now to be described.

The primary worm shaft 18 carries a worm 30, and the secondary worm shaft 21 carries a worm 31. The worm 30 meshes with a ring-shaped gear 32 which is mounted upon the face of the shouldered hub 33 of the cage 34. The hub is mounted upon ball bearings 35 carried within a race 36 mounted upon a driven shaft 37 which is journalled within ball bearings 38 mounted within a closing plate 39 constituting one of the end walls of the casing.

The periphery 40 of the cage 34 affords a mounting for a pair of inwardly projecting oppositely disposed stub shafts 41 each surrounded with a bushing 42 which affords a bearing for a beveled pinion 43. The two beveled pinions 43, which may be termed the revolving pinions, mesh on one side with a driven beveled pinion 44 keyed to the shaft 37, and on the other side mesh with a transmission beveled pinion 45 the hub of which is journalled upon inner ball bearings 46 and outer ball bearings 47 carried by the reduced end of the shaft 37 which is journalled at its terminus within ball bearings 48 mounted within a boss 49 in the end wall 50 of the casing and held in place by a cap 51. The adjacent portion of the cage is mounted upon ball bearings 52 which are carried by the hub of the transmission pinion 45, which also has keyed thereon a hub 53 of a transmission worm gear 54 meshing with the worm 31.

The arrangement is such that the cage with the revolving pinions will be driven at a constant speed through the flat faced pulley 17, primary worm shaft 18, worm 30 and worm gear 32, and in the absence of resistance the teeth of the revolving pinions would intermesh freely with the teeth of the keyed driven pinion 44, without imparting rotation to the driven shaft 37. The speed and direction of rotation imparted to the driven shaft, therefore, will depend upon the speed of rotation imparted to the transmission pinion 45 through the variable speed drive afforded by the divided grooved pulley.

Thus, with the transmission pinion 45 rotating in the same direction as the rotation of the cage carrying the revolving pinions, and at a rate of peripheral speed equal to the peripheral speed of the revolving pinions, the latter will be permitted to rotate freely around their respective shafts during their orbital travel upon the face of the driven pinion 44, so that no resistance will be afforded to impart rotation to the driven shaft 37, which in these conditions will stand stationary.

If, however, the speed of rotation of the pinion 45, in the same direction as the cage, exceeds the speed of rotation imparted to the revolving orbital pinions by the rotation of the cage, a thrust will be established which imparts an opposite rotation to the driven shaft 37. In like manner, when the speed of rotation of the transmission pinion 45 is less than the neutral rotation of the orbital pinions, the same direction of rotation will be imparted to the shaft 37.

As shown in Fig. 5, the belt 16 occupies an intermediate position within the divided pulley, which represents the neutral or idle condition within which the rotation imparted to the transmission pinion 45 is equal and in the same direction as the rotation of the orbital pinions imparted by the cage. By drawing in the belt 16 toward the axis of the shaft 21, the speed of rotation of the pinion 45 is rapidly increased, with resultant opposite rotation of the driven shaft, so that in practical operation it is easily possible by the selection of appropriate gears to impart to the driven shaft variations in speed of unlimited ratio, and also by allowing the belt 16 to move outwardly beyond the intermediate position it is possible to provide variable rotation of the driven shaft in the same direction as the pinion 45.

In order to adjust the position of the belt 16, the motor platform 13 is hingedly mounted upon a pivot rod 55 entered through a suitable hanger bracket 56 forming part of the frame of the machine, which as shown depends from a platform 57 which supports the variable transmission casing. For quick changing of speed the free edge of the platform 13 is tilted upwardly by means of a thrust connection 58 operated by a foot treadle 59.

For a selected normal operating speed the parts are positioned through the medium of an adjusting screw 60 entered through a screw block 61 mounted between trunnions 62 in a bracket 63 pivotally secured for upward lifting under the edge of the platform 13, which permits the platform to be raised independently of the thrust connection operated by the foot treadle while allowing the foot treadle to thrust the platform upwardly regardless of its selectively adjusted position. The adjusting screw is provided at its upper end with a beveled pinion 64 meshing with a beveled pinion 65 on a shaft 66 rotated by a sprocket chain 67 actuated by a hand wheel 68.

In order to arrest the movement of the platform 13 at zero speed, a plunger 69 is provided, backed by a spring 70 located within a tubular sleeve 71 and adjustable by the provision of nuts 72, so that when the platform strikes the end of the plunger, an indication is given to the operator that the neutral or zero adjustment has been reached.

As the belt is drawn inwardly toward the axis of the shaft 21, the spring tension against the sides of the belt increases, and, to balance against increase in tension, a compensator, shown in Fig. 2, is provided, which consists of a sprocket chain 73, one end of which is secured to the free edge of the platform 13, and thence carried around an eccentrically mounted sprocket wheel 74 and secured to a spring 75 connected with a fixed portion of the frame.

The sprocket wheel 74 is eccentrically mounted in such relation that as the platform 13 is drawn downwardly and the belt 16 is drawn inwardly, and as increasing spring pressure is imposed upon the movable member of the divided pulley, the pull of the spring 75 will be imparted through an increased lever ratio to balance against the tendency of the divided pulley to force the belt outwardly toward the periphery. Thus, these forces tend to balance against one another and permit even and accurate adjustment of the platform 13 to hold the belt in properly adjusted position to secure the desired variable speed ratio.

In Fig. 4 we have indicated the various positions of adjustment of the motor shaft to secure the various speed ratios within the range of the mechanism shown. With the platform adjusted to bring the motor shaft to the center indicated by the legend High speed, the driving belt will be drawn in to a point closely adjacent to the hub 24 of the fixed pulley section, while intermediate adjustments up to the center marked Neutral, will afford the desired variations of speed in the forward direction. When the motor shaft is adjusted to the center marked Reverse, the belt 16 will occupy the position at or adjacent to the periphery of the divided pulley. Of course, the range of speed variations will depend upon the degree of adjustment of the belt permitted by the size and configuration of the parts.

As shown, the rotation imparted to the driven shaft 37 is transmitted through a sprocket wheel 76 and a sprocket chain 77 to the sheet or web feeding mechanism of a photo-printing machine, but it is not deemed necessary to describe such mechanism, which serves merely for purposes of illustrating one of the numerous uses to which the present invention may be applied.

The arrangement is one in which a comparatively slight variation in the speed of rotation of the driving pinion 45, with relation to the rotation of the cage 34 and the orbital moving pinions, may be utilized through suitable gear ratios to multiply the variation in speed imparted to the driven shaft 37, and in view of the fact that the employment of a divided pulley permits of an infinite number of intermediate adjustments, it is thus possible to provide for a wide range and accurate variation at any speed ratio desired.

For ordinary service, the employment of a foot treadle will suffice to give the desired speed variations, but where greater accuracy is desired, the screw adjustment may be employed in lieu of the foot treadle, it being understood that where the foot treadle is to be employed solely, the adjusting screw may be disconnected.

Although the invention has been described with particularity as to detail, it is not the intention, unless otherwise indicated in the claims, to limit the invention to the mechanism shown, since modifications in detail may be made without departing from the principle of the invention.

We claim:

1. In variable speed transmission mechanism, the combination of a primary shaft and a secondary shaft each provided with a worm, a worm gear meshing with the primary worm and a cage carried by said worm gear, orbital gears rotatably mounted within the cage and revolving therewith, a driven shaft in train with said orbital gears, transmission gear means in train with the secondary worm and with the orbital gears, means for imparting variable speeds of rotation to the secondary shaft and the gear means in train therewith, said means including a divided pulley and a belt adapted to be variably adjusted with relation to the axis of the pulley, a pulley on the primary shaft over which said belt travels to impart uniform rotation thereto, a motor having a constantly driven pulley with which said belt is engaged, and an adjustable mounting for the motor to vary the position of the belt with relation to the axis of the divided pulley.

2. In variable speed transmission mechanism, the combination of a primary shaft and a secondary shaft each provided with a worm, a worm gear meshing with the primary worm and a cage carried by said worm gear, orbital gears rotatably mounted within the cage and revolving therewith, a driven shaft in train with said orbital gears, transmission gear means in train with the secondary worm and with the orbital gears, means for imparting variable speeds of rotation to the secondary shaft and the gear means in train therewith, said means including a divided pulley and a belt adapted to be variably adjusted with relation to the axis of the pulley, a pulley on the primary shaft over which said belt travels to impart uniform rotation thereto, a motor having a constantly driven pulley with which said belt is engaged, a hinged platform upon which the motor is mounted, and means for varying the position of the platform and motor to adjust the belt with relation to the axis of the divided pulley.

3. In variable speed transmission mechanism, the combination of a primary shaft and a secondary shaft in spaced parallel relation to one another and each provided with a driving gear member, a driven gear member meshing with the primary driving gear member and a cage carried by said driven gear member, orbital gears rotatably mounted within the cage and revolving therewith, a driven shaft in train with said orbital gears, transmission gear means in train with the secondary gear member and with the orbital gears, means for imparting variable speeds of rotation to the secondary shaft and the gear means in train therewith, said means including a divided pulley having a spring backed member and a belt adapted to be variably adjusted under tension with relation to the axis of the pulley, a pulley on the primary shaft over which said belt travels to impart uniform rotation thereto, a motor driving a constantly rotating pulley with which said belt is engaged, an adjustable mounting for the motor to vary the position of the belt with relation to the axis of the divided pulley, screw means for accurately adjusting the position of said mounting, and treadle means engaging said mounting for imparting quick adjustments thereto independently of the screw adjustment.

4. In variable speed transmission mechanism, the combination of a primary shaft and a secondary shaft in spaced parallel relation to one another and each provided with a driving gear member, a driven gear member meshing with the primary driving gear member and a cage carried by said driven gear member, orbital gears rotatably mounted within the cage and revolving therewith, a driven shaft in train with said orbital gears, transmission gear means in train with the secondary gear member and with the orbital gears, means for imparting variable speeds of rotation to the secondary shaft and the gear means in train therewith, said means including a divided pulley having a spring backed member and a belt adapted to be variably adjusted under tension with relation to the axis of the pulley, a pulley on the primary shaft over which said belt travels to impart uniform rotation thereto, a motor driving a constantly rotating pulley with which said belt is engaged, a hinged platform upon which the motor is mounted, screw means connected with the platform for accurately varying the position of the platform and motor to adjust the belt with relation to the axis of the divided pulley, and treadle means engaging the platform for imparting quick adjustments thereto independently of the screw adjustment.

5. In variable speed transmission mechanism, the combination of a primary shaft and a secondary shaft in spaced parallel relation to one another and each provided with a driving gear member, a driven gear member meshing with the primary driving gear member and a cage carried by said driven gear member, orbital gears rotatably mounted within the cage and revolving therewith, a driven shaft in train with said orbital gears, transmission gear means in train with the secondary gear member and with the orbital gears, means for imparting variable speeds of rotation to the secondary shaft and the gear means in train therewith, said means including a divided pulley having a spring backed member and a belt adapted to be variably adjusted under tension with relation to the axis of the pulley, a pulley on the primary shaft over which said belt travels to impart uniform rotation thereto, a motor driving a constantly rotating pulley with which said belt is engaged, a hinged platform upon which the motor is mounted, a pivoted bracket projecting outwardly from the platform and adapted to impart lifting movements thereto, a screw block pivoted to the free end of the bracket and an adjusting screw threaded through said screw block for imparting fine adjustments to the platform, and treadle means positioned to impart a lifting thrust to the pivoted platform independently of the screw adjustment.

PAUL B. STREICH.
HERBERT G. MACDONALD.